United States Patent [19]

Herrmann et al.

[11] 4,322,554

[45] Mar. 30, 1982

[54] POLYMERIC AZOMETHINES

[75] Inventors: Hans-Joachim Herrmann, Troisdorf; Günther Meyer, Troisdorf Sieglar; Klaus-Dieter Steffen, Hennef, all of Fed. Rep. of Germany

[73] Assignee: Dynamit Nobel Aktiengesellschaft, Troisdorf, Fed. Rep. of Germany

[21] Appl. No.: 156,449

[22] Filed: Jun. 4, 1980

[30] Foreign Application Priority Data

Jun. 21, 1979 [DE] Fed. Rep. of Germany ....... 2924944

[51] Int. Cl.$^3$ .................... C07C 119/10; C09B 55/00
[52] U.S. Cl. ................... 564/273; 525/158; 525/160
[58] Field of Search ............... 564/270, 272, 275, 273; 260/37 P; 525/160

[56] References Cited

U.S. PATENT DOCUMENTS 3,892,750 7/1975 Frey .................................. 260/37 P

FOREIGN PATENT DOCUMENTS 76970 12/1970 Fed. Rep. of Germany ...... 564/272

*Primary Examiner*—Theodore E. Pertilla
*Attorney, Agent, or Firm*—Sprung, Felfe, Horn, Lynch & Kramer

[57] ABSTRACT

An aromatic polyazomethine of the structural formula

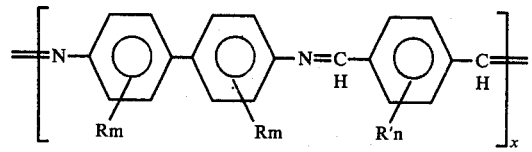

wherein
R represents hydrogen, halogen, alkyl or alkoxy,
R' represents identical or different alkyl moieties which can be terminally halogen substituted or halogen or hydrogen,
n and m represent values between 0 and 2, and
x is equal to or less than 100.

Also disclosed is a method for preparing such polyazomethine by contacting a benzidine compound of the formula

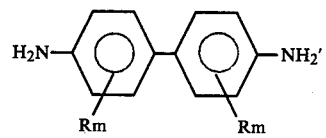

wherein R and m have the meanings given above in an organic solvent with a dialdehyde of the formula

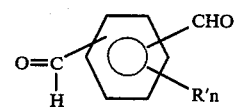

wherein R' and n have the meanings given above. Preferably a solvent which forms an azeotrope with water is employed. The polyazomethines are useful as coloring materials e.g. pigments for polymers, especially thermoplastic polymers.

2 Claims, No Drawings

POLYMERIC AZOMETHINES

BACKGROUND OF THE INVENTION

1. Field of the Invention

The invention relates to new polymeric azomethines and to process for preparing the same by condensation of a substituted benzidine and a dialdehyde. They are of an intense yellow or yellow-green to orange color. They have an extraordinarily high thermal stability and are suitable for use as pigments in various plastics.

2. Discussion of the Prior Art

It has long been known to prepare azomethines, which are also called "Schiff bases" in the literature, and have the general formula

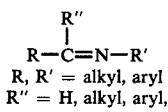

R, R' = alkyl, aryl
R" = H, alkyl, aryl, from primary amines and aldehydes or ketones with the liberation of water (e.g., benzalaniline according to Schiff, Liebigs Annalen der Chemie, Supplement 3, 353):

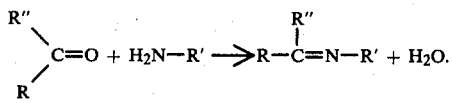

This reaction can also be applied to bifunctional and polyfunctional aldehydes, resulting in the formation of polymeric or crosslinked polymeric azomethines with the liberation of more water molecules. Aromatic aldehydes and amines usually result in colored compounds.

Aromatic polymeric azomethines are described by Manecke et al in Makromol. Chem., (1970), 133, pp. 61–82. The structural units of these polymers are derived from 2,5-dihydroxyterephthalic dialdehyde and, for example, unsubstituted benzidine. They are prepared by the condensation of the dialdehyde with the amine in glacial acetic acid as solvent, with the addition of sodium acetate. The reaction mixture is refluxed, and the reaction product that precipitates is suction filtered. For purification, the product must be extracted for eight hours with water and a mixture of methanol and acetone.

Disadvantageous in this procedure is the use of acetic acid as solvent, and the fact that the products obtained are impure and have to be subjected to an additional, tedious purifying operation. In spite of these drastic circumstances, the yields are only between 40% and 80% of the theory.

Furthermore, a method is described in German Offenlegungsschrift No. 2,601,821 for the preparation of polyazomethines by the condensation of terephthalic dialdehyde and phenylene diamines, among others. The starting products are reacted in the gaseous phase, and are used immediately following their preparation for the sealing of objects. This method of procedure has the disadvantage that it has to be performed at relatively high temperatures, with the attendant expenditure of energy, in correspondingly expensive apparatus. Since it is very strongly application-related, it is not suitable for the production of larger and more widely useful amounts.

There is a strong demand on the plastics market for yellow pigments having good thermal stability, colorfastness and no tendency to bleed. The problem therefore existed of preparing pigments having these properties from substituted benzidines and aromatic aldehydes. Such pigments must be thermally stable so that they can withstand all fabrication processes without harm, and they must have no tendency to bleed. The problem also existed of finding the correct selection of the substituents on the benzidine and aldehyde benzene nuclei and to discover a gentle method for the preparation of these new compounds. Such a method should make it possible, furthermore, to achieve a high transformation, and to separate any starting products still present, or any newly formed by-products, by simple means. It should also be one which permits the solvents re-use, so as to minimize the amount of labor required and the attendant risk of degradation.

SUMMARY OF THE INVENTION

As a solution to this problem, aromatic polyazomethines based on benzidine have been found, which are characterized by structural elements of the formula:

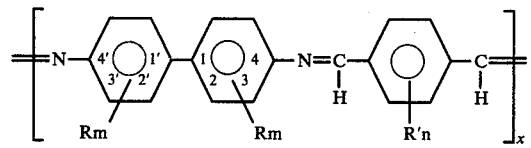

wherein
R = halogen, alkyl, alkoxy or H
R' = H, halogen or alkyl,
m = 0–2
n = 0–2
x = 2–100.

Furthermore, a method of preparing these compounds has been found, which is characterized by contacting at elevated temperature a benzidine of the formula

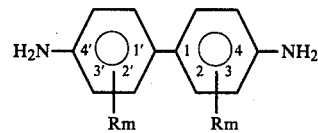

wherein R and m have the meaning given above, with an aromatic dialdehyde of the formula

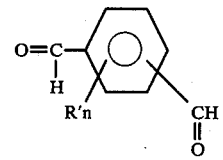

wherein R' and n have the meaning given above, in an organic solvent which serves as a withdrawing agent for the removal of the reaction water. The water that is formed in the reaction is preferably removed from the reaction medium in the course of the reaction. The removal is preferably performed by azeotropic distillation with the solvent. It is therefore preferred to use solvents which form an azeotrope with water.

The dialdehydes that are usable as starting products comprise mainly phthalic dialdehyde, isophthalic dialdehyde and terephthalic dialdehyde. However, the corresponding dialdehydes which are substituted in the nucleus with halogen or alkyl groups can also be used, in which case the alkyl group can have between 1 and 8 carbon atoms and can also be terminally substituted with halogen.

In the benzidines used as starting product, the substituents can be either in position 2 or in position 3. The preferred diamine component is 3,3'-dichlorobenzidine. Instead of the free benzidine bases, their salts with strong inorganic or organic acids can also be used, such as, for example, the hydrochlorides. The benzidines can be ring substituted at the 2 or 3 position with alkyl or alkoxy groups of 1 to 8 carbon atoms. Additionally, it can be halogen substituted.

In order to remove the reaction water under gentle conditions, those solvents are used which form an azeotropic mixture with the reaction water and remove it rapidly from the reaction mixture before other substituents are attacked. These include saturated or unsaturated aliphatic or aromatic hydrocarbons or chlorinated hydrocarbons. The following are given as examples: benzene, toluene, the xylenes, chloroform, n-hexane, n-heptane and higher open-chain or cyclic hydrocarbons of the aromatic or aliphatic series. Aliphatic alkyl esters of low aliphatic carboxylic acids ($C_1$ to $C_4$) are also suitable, such as acetic acid ethyl ester, for example.

The starting products are used preferably in stoichiometric ratios, although one component can also be used in an excess with respect to the second. The weight-ratio of the solvent to the reaction components can vary within wide limits. The amount of solvent is advantageously made such that the reaction product precipitates at the end of the reaction largely in pure form but the entire reaction mixture remains stirrable. This is especially the case if the amount of solvent is between the same amount and twenty times the amount of the reactants on a weight basis.

The condensation is performed at temperatures between 10° and 200° C., preferably between 30° and 140° C. The temperature to be selected is determined by the choice of the boiling point under the reaction conditions of the solvent or of the azeotropic mixture of water and solvent.

After all the components have been combined, the distillation from the reaction vessel of the reaction water in the azeotrope together with the withdrawing agent serving as solvent is started. It is also possible to start the distillation and to add during the distillation further parts of one or both reactants. The reaction water is separated from the distillate if possible so that the end of the reaction can be known. This can easily be detected by the cessation of the separation of water.

As soon as the reaction has ended, the usually solid reaction product is filtered out, washed if necessary with solvent, and dried at elevated temperature, and, if desired, at reduced pressure. The reaction product usually precipitates during the reaction and by the end of the reaction it is in the form of a substantially insoluble solid in a easily filterable suspension.

In comparison to the known method, the method of the invention has the following advantages: the condensation to the Schiff base takes place surprisingly under very mild conditions; the addition of a catalyst is unnecessary although the process can be carried out with or without a catalyst. In spite of these mild conditions, one can by means of the azeotropic distillation of the reaction water achieve a virtually complete transformation and hence a high yield. The isolation of the reaction products is performed by a simple filtration followed by drying. The polyazomethines thus obtained are distinguished by a high purity and are produced mainly in high yields. After the withdrawing agent has been purified by distillation it can be recycled.

The polyazomethines of the invention are powdery substances of an intense yellow or yellow-green to orange color. They show no sign of softening up to 300° C. They are insoluble in the common organic solvents. Molecular weight determinations are therefore possible only with difficulty. Recourse can be taken for this purpose to the aldehyde terminal groups on the basis of analytic determinations of oxygen. Accordingly, the new compounds have a molecular weight between 2000 and 7000 ($x=5$ to 20). It is also possible, however, to prepare compounds of higher molecular weight ($x=$ max. 100).

The thermal stability of these polyazomethines is amazingly high. For example, in the case of the polyazomethine prepared from 3,3'-dichlorobenzidine and terephthalic dialdehyde, thermogravimetric analysis (under nitrogen gas) shows weight losses of 1% at 354° C. and 10% at 432° C. Consequently, when these pigments are incorporated into plastics at the commonly used temperatures of 230° to 300° C., they do not suffer any damage.

The polyazomethines are furthermore characterized by their infrared spectra.

The described polyazomethines are excellently suitable for the coloring of addition polymers and polycondensates, such as, for example, PVC, PVF, PVDF and other polyolefins, polycarbonates, and other polyesters such as PTMT. To produce a yellow tint in PTMT, the addition of only 0.01% by weight is necessary.

In general, amounts of only between 0.05 and 1% with respect to the weight of the polymer are required in order to provide it with sufficient coloring. Of course, larger amounts can be used, although the color deepening action does not increase so greatly.

The pigment is present in the plastics in a perfectly uniform distribution, as proven by electron photomicrographs. The transparency of the colored plastics is fully maintained.

The new polyazomethines are distinguished not only by good optical properties but also by an extremely low tendency to bleed out, even after long use.

In order to more properly illustrate the invention and the manner of practicing the same, the following examples are set forth:

EXAMPLES

EXAMPLE 1

25.3 g of 3,3'-dichlorbenzidine were dissolved by heating in 100 g of p-xylene and dewatered by refluxing with the aid of a water separator. A solution of 13.4 g of terephthalic dialdehyde in 100 g of hot p-xylene was added to the first solution over a period of 20 minutes, and the mixture obtained was heated at the boiling temperature. The reaction water that formed was removed by distillation as an azeotrope with p-xylene, from which it was then separated. An intensely yellow solid soon began to precipitate.

After 5 to 6 hours of reaction, the condensation was ended after the separation of 3.4 g of water. The xylene was largely removed by hot filtration. The filter cake was then washed with 100 g of hot p-xylene and dried at 190° C. and 20 mbar. The product was 32.6 g (=90% of the theory) of a lemon-yellow, free-flowing, finely granular powder which, when incorporated into thermoplastics at a low concentration, is capable of tinting them.

The polymer obtained has no melting point; decomposition begins at 350° C. in air, or at more than 400° C. in an inert gas. The degree of condensation, as calculated on the basis of the residual content of carboxyl terminal groups, is approximately 5 to 7.

$C_{20}H_{12}N_2Cl_2$ (351.2).

Calculated: C: 68.37, H: 3.42, N: 7.98, O: 0.00, Cl: 20.23; Found: C: 67.87, H: 3.51, N: 7.73, O: 0.78, Cl: 19.60.

EXAMPLE 2

25.3 g of 3,3'-dichlorobenzidine was reacted with 13.4 g of phthalic dialdehyde as described in Example 1, and the polyazomethine obtained was isolated. 27.25 g, corresponding to a yield of 78% of the theory, of a yellow polyazomethine was obtained, which begins to decompose above 350° C. in air.

If the p-xylene is replaced by n-hexane, n-heptane or higher aliphatics, the same results are obtained with considerably longer reaction times.

$C_{20}H_{12}N_2Cl_2$ (351.2).

Calculated: C: 68.37, H: 3.42, N: 7.98, O: 0.00, Cl: 20.23; Found: C: 66.68, H: 3.36, N: 7.40, O: 1.54, Cl: 19.47.

EXAMPLE 3

25.3 g of 2,2'-dichlorbenzidine was reacted with 13.4 g of terephthalic dialdehyde as described in Example 1, and the polyazomethine that formed was isolated. 33.3 g (95% of the theory) was obtained of a bright yellow polyazomethine whose temperature of initial decomposition was higher than 350° C. in an air atmosphere.

If the p-xylene is replaced by toluene or benzene, the same results are obtained with longer reaction times.

$C_{20}H_{12}N_2Cl_2$ (351.2).

Calculated: C: 68.37, H: 3.42, N: 7.98, O: 0.00, Cl: 20.23; Found: C: 67.72, H: 3.18, N: 7.64, O: 1.02, Cl: 19.80.

EXAMPLE 4

25.3 g of 3,3'-dichlorbenzidine was reacted with 13.4 g of isophthalic dialdehyde as described in Example 1, and the polyazomethine that formed was isolated. 33.2 g (yield 94% of the theory) of a bright yellow powder was obtained, which had a degradation onset temperature above 350° C. in an air atmosphere.

$C_{20}H_{12}N_2Cl_2$ (351.2).

Calculated: C: 68.37, H: 3.42, N: 7.98, O: 0.00, Cl: 20.23; Found: C: 68.30, H: 3.46, N: 7.90, O: 0.5, Cl: 20.38.

EXAMPLE 5

24.4 g of 3,3'-dimethoxybenzidine was reacted as described in Example 1 with 13.4 g of terephthalic dialdehyde, and the polyazomethine that formed was isolated. 39.7 g (yield 90% of the theory) of an intensely yellow powder was obtained, having a degradation onset temperature above 320° C. in an air atmosphere.

$C_{22}H_{18}N_2O_2$ (432.6).

Calculated: C: 76.74, H: 5.81, N: 8.14, O: 9.30; Found: C: 76.03, H: 5.74, N: 7.34, O: 9.69.

EXAMPLE 6

21.2 g of 3,3'-dimethylbenzidine and 13.4 g of terephthalic dialdehyde were reacted as described in Example 1, and the polyazomethine that formed was isolated. The product was 28.1 g (yield 91% of the theory) of a deep yellow powder having a degradation onset point above 300° C. in an air atmosphere.

$C_{22}H_{18}N_2$ (310.4)

Calculated: C: 84.61, H: 6.41, N: 8.97, O: 0.00; Found: C: 84.25, H: 6.21, N: 8.85, O: 1.20.

EXAMPLE 7

18.4 g of benzidine and 13.4 g of terephthalic dialdehyde were reacted as described in Example 1 and the polyazomethine that formed was isolated. 26.7 g (yield 95% of the theory) was obtained of an orange-colored powder having a degradation onset point above 320° C. in an air atmosphere.

$C_{20}H_{14}N_2$ (282.3).

Calculated: C: 85.11, H: 4.96, N: 9.93, O: 0.00; Found: C: 83.76, H: 5.33, N: 9.50, O: 1.21.

What is claimed is:

1. A process for preparing a polyazomethine which comprises contacting a benzidine or its derivative of the formula

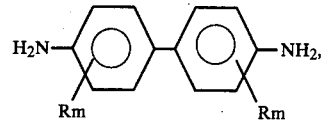

wherein R can represent hydrogen, halogen, alkyl or alkoxy and m can assume a value between 0 and 2 in an organic solvent with a dialdehyde of the formula

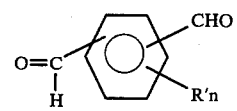

wherein R' represents identical or different alkyl moieties which can be terminally halogen substituted or halogen or hydrogen, n can assume a value between 0 and 2, the two carbonyl groups being in ortho, meta, or para position with respect to one another in an organic solvent which forms an azeotrope with water, said organic solvent being an aliphatic or aromatic hydrocarbon or chlorinated hydrocarbon, said process being carried out at a temperature at which said solvent boils or at which an azeotrope of said solvent with water forms.

2. A method according to claim 1 wherein the method is coordinated at a temperature of 30° to 140° C.

* * * * *